(12) United States Patent
Andersson

(10) Patent No.: US 8,790,024 B2
(45) Date of Patent: Jul. 29, 2014

(54) TOP COVER ASSEMBLY FOR A MONITORING CAMERA

(71) Applicant: AXIS AB, Lund (SE)

(72) Inventor: Johan Andersson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 13/867,712

(22) Filed: Apr. 22, 2013

(65) Prior Publication Data

US 2013/0287385 A1    Oct. 31, 2013

Related U.S. Application Data

(60) Provisional application No. 61/638,305, filed on Apr. 25, 2012.

(30) Foreign Application Priority Data

Apr. 25, 2012 (EP) .................................. 12165481

(51) Int. Cl.
G03B 17/00    (2006.01)

(52) U.S. Cl.
USPC .......................................................... 396/427

(58) Field of Classification Search
CPC ........ H04N 5/224; G03B 17/00; G03B 17/02; G08B 13/19619
USPC .................. 396/427; 348/143, 151
See application file for complete search history.

(56) References Cited

U.S. PATENT DOCUMENTS

| | | | |
|---|---|---|---|
| 5,765,043 A * | 6/1998 | Tyler ............................... | 396/12 |
| 6,234,691 B1 * | 5/2001 | Jones et al. ................... | 396/427 |
| 6,268,882 B1 * | 7/2001 | Elberbaum .................... | 348/151 |
| 6,354,749 B1 * | 3/2002 | Pfaffenberger, II ........... | 396/427 |
| 7,621,680 B2 * | 11/2009 | Frick et al. ..................... | 396/419 |
| 7,841,782 B2 * | 11/2010 | Tatewaki ....................... | 396/427 |
| D636,804 S * | 4/2011 | Anneback et al. ............ | D16/203 |
| 7,990,468 B2 * | 8/2011 | Yamamoto .................... | 348/373 |

(Continued)

FOREIGN PATENT DOCUMENTS

| | | |
|---|---|---|
| KR | 20090050797 | 5/2009 |
| WO | 2010/067920 | 6/2010 |

OTHER PUBLICATIONS

European Search Report mailed on Oct. 3, 2012, issued for European Patent Application No. 12165481.8, filed on Apr. 25, 2012 (English).

*Primary Examiner* — Rodney Fuller
(74) *Attorney, Agent, or Firm* — Oblon, Spivak, McClelland, Maier & Neustadt, L.L.P.

(57) ABSTRACT

A top cover assembly for a monitoring camera assembly that includes a mounting portion arranged for attachment to a mounting base for a monitoring camera, a dome window arranged on the mounting portion and a lining arranged at an inside of the dome window, the lining having a camera view opening adapted to a field of view of the monitoring camera and being rotatable in relation to the mounting portion, and the lining having a guiding portion arranged for engagement with a camera mounting bracket on the mounting base to position the lining in relation to the monitoring camera such that the camera view opening covers the field of view of the monitoring camera, when mounting the top cover assembly on the mounting base, thereby allowing the mounting portion to be rotated in relation to the lining into a position for attaching the mounting portion to the mounting base.

13 Claims, 6 Drawing Sheets

(56) References Cited

U.S. PATENT DOCUMENTS

| | | |
|---|---|---|
| 8,066,438 B2 | 11/2011 | Takahashi |
| 8,174,573 B2* | 5/2012 | Lin et al. .................... 348/143 |
| 2007/0126871 A1* | 6/2007 | Henninger et al. ........... 348/151 |
| 2007/0126872 A1 | 6/2007 | Bolotine et al. |
| 2008/0056708 A1 | 3/2008 | Kim |
| 2009/0162048 A1 | 6/2009 | Tatewaki |
| 2010/0128123 A1* | 5/2010 | DiPoala .................... 348/143 |
| 2010/0225802 A1 | 9/2010 | Yamamoto |
| 2011/0064403 A1* | 3/2011 | Nakano et al. ................ 396/535 |
| 2011/0310293 A1 | 12/2011 | Yamauchi et al. |

\* cited by examiner

TOP COVER ASSEMBLY FOR A MONITORING CAMERA

CROSS-REFERENCE TO RELATED APPLICATION

The present application claims the benefit of the earlier filing date of U.S. Provisional Patent Application Ser. No. 61/638,305, filed on Apr. 25, 2012, and EP Application No. 12165481.8, filed on Apr. 25, 2012, the entire contents of each of which being incorporated herein by reference.

TECHNICAL FIELD

The present invention relates to a top cover assembly for a monitoring camera.

TECHNICAL BACKGROUND

Monitoring cameras are commonly used for monitoring areas both indoors and outdoors, such as bank offices, department stores or public places. The camera is in some cases arranged for dynamic panning and tilting in order to enable image acquisition from different positions in the specific area, and in some cases the camera is panned and tilted to a desired fixed position by an operator when installing the camera. The latter alternative is often denoted a fixed camera installation.

The camera is usually covered by a dome window which protects the camera from dust and water, especially when mounted outdoors, as well as from unauthorized tampering or vandalism.

In a fixed camera installation, an inner cover or lining is normally arranged under the dome window to protect the camera from glare and reflexes from the dome window. The lining is opaque and contains an opening for the field of view of the camera, and it may be rotated to position the opening in the shooting direction of the camera.

When mounting the fixed camera, the operator usually first mounts a mounting base in the desired position on the wall or in the ceiling, and the camera is attached to the mounting base. The camera is then rotated to the desired fixed pan and tilt position by the operator, and the dome window is placed over the camera and screwed into place. Before attaching the dome window, the lining has to be positioned according to the shooting direction or field of view of the camera. This may be a cumbersome process, as the lining is placed on the inside of the dome and its position must be manipulated by the operator when the dome is not in place, in turn meaning that the direction of the field of view of the camera must be estimated by the operator.

US 2010/0225802 discloses a monitor camera having a dome-type cover with an inner cover with an open window and outer cover placed over the inner cover. When the outer cover is turned in the counter-clockwise direction while being pushed up by hand, a one-way clutch mechanism enables the inner cover to be rotated with the outer cover to position the open window in a position corresponding to the camera lens.

However, further improvements in this field are needed.

SUMMARY OF THE INVENTION

An object of the present invention is to simplify the installation process of a fixed monitoring camera.

This and further objects are achieved by a top cover assembly for a monitoring camera assembly according to claim 1, and by means of a monitoring camera assembly according to claim 12. Further embodiments of the invention are presented in the dependent claims.

More in detail, a top cover assembly for a monitoring camera assembly comprises a mounting portion arranged for attachment to a mounting base for a monitoring camera, a dome window arranged on the mounting portion, a lining arranged at an inside of the dome window having a camera view opening adapted to a field of view of the monitoring camera, the lining being rotatable in relation to the mounting portion and having a guiding portion arranged for engagement with a camera mounting bracket on the mounting base to position the lining in relation to the monitoring camera such that the camera view opening covers the field of view of the monitoring camera, when mounting the top cover assembly on the mounting base, thereby allowing the mounting portion to be rotated in relation to the lining into a position for attaching the mounting portion to the mounting base.

This means that the top cover assembly may be positioned and installed in a less cumbersome manner. The installation process is simplified and less time needs to be spent on installing each top cover assembly. As a further advantage the engagement of the guiding portion with the camera mounting bracket holds the lining in the correct position with the opening covering the field of view of the camera during use of the monitoring camera and stops the lining from being rotated by vibrations or hits or blows against the dome window.

The guiding portion may comprise a slot arranged to receive a matching portion of the camera mounting bracket. This provides a simple and efficient way of providing the guiding portion. The guiding portion may in this way easily be adapted to an existing camera bracket and the top cover assembly may be used as a spare part e.g. when there is a need to change a broken or damaged dome window.

As an alternative or in combination with the above, the guiding portion may comprise a tab arranged to engage with a matching slot at the camera mounting bracket.

The guide portion may further comprise a lip for enhancing the guiding properties of the guiding portion. The lip may be slanted to provide a tapering adapted to the matching portion or slot of the mounting bracket. In this way the guiding is made even more convenient as the guiding portion slides loosely onto or into the mounting bracket and is guided with increasing tightness as the mounting portion approaches the mounting base.

The lining may comprise a hemispherical section following the shape of the dome window, and an annular section arranged at an edge of the hemispherical section. The guiding portion may be arranged at the annular section, and the camera view opening in the hemispherical section.

The hemispherical section and the annular section may be two separate pieces attached to each other, e.g. by a screw joint, by a glue bond, by an ultrasonic welding joint, or by a snap connection. To provide the two sections separate from each other and then attaching them to each other provides a simplified manufacturing process.

As an alternative, the lining may comprise the hemispherical section following the shape of the dome window, wherein the guiding portion is arranged at the hemispherical section and has the form of ribs extending inwards from the hemispherical section. This is useful particularly for a smaller camera arrangement where the ribs may be provided with satisfactory structural stability and then may replace a separate annular section having a slot for the camera bracket. The ribs or walls provide the functionality of a slot and are arranged for gripping or engaging the camera mounting bracket.

As mentioned above, as a further alternative, a tab may be arranged on the hemispherical section for engagement with a matching slot on the camera mounting bracket.

The lining may be made of an opaque material and the dome window of a transparent material. In this way the camera is protected against reflexes and glare by the lining, and protected from the outside environment by the dome glass while maintaining a good visibility for image capturing purposes.

The dome window may be rotatable in relation to the lining, which means that if someone is trying to obscure the view of the camera by trying to move the opening in the lining by pressing and/or rotating the dome window they will not be successful. Thus, the camera is even further protected against tampering.

According to a further aspect of the invention providing corresponding advantages, a monitoring camera assembly comprises a mounting base, a monitoring camera mounted on the mounting base via a camera mounting bracket, and a top cover assembly as described above.

The camera mounting bracket may be tapered, and the guiding portion may comprise a lip slanted to provide a tapering which matches the tapering of the mounting bracket. This further enhances the ease of installation of the top cover on the mounting base while correctly positioning the lining in relation to the camera.

In one embodiment, the mounting portion comprises a plurality of protrusions arranged to slot into matching cut-outs on the mounting base when the mounting portion is in the position for attaching the mounting portion to the mounting base. This simplifies the installation of the top cover assembly, since when the operator rotates the mounting portion in relation to the lining to find the correct position for attaching the mounting portion to the mounting base, this position is easily noted as the protrusions then slide into the cut-outs. The operator is also aided during the attachment process, e.g. when fastening screws, by the mounting portion being held against sideways movement by the engagement between the protrusions and the cut-outs.

In addition, when a sealing gasket is arranged between the mounting portion and the mounting base, this gasket will be protected from frictional wear, by the provision of the protrusions which will provide a distance between the mounting portion and the mounting base, when the mounting portion and the mounting base are rotated in relation to each other to find the correct position for mounting.

The guiding portion may be arranged with a play in a radial direction to the camera mounting bracket. This reduces the risk of transferring any blows or hits on the dome window or the mounting portion to the camera mounting bracket and the camera.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a guiding portion" or "the guiding portion" may include several guiding portions, and the like. Furthermore, the word "comprising" does not exclude other elements or steps.

BRIEF DESCRIPTION OF THE DRAWINGS

Other features and advantages of the present invention will become apparent from the following detailed description of presently preferred embodiments, with reference to the accompanying drawings, in which.

DETAILED DESCRIPTION OF EMBODIMENTS OF THE INVENTION

Figure 1:
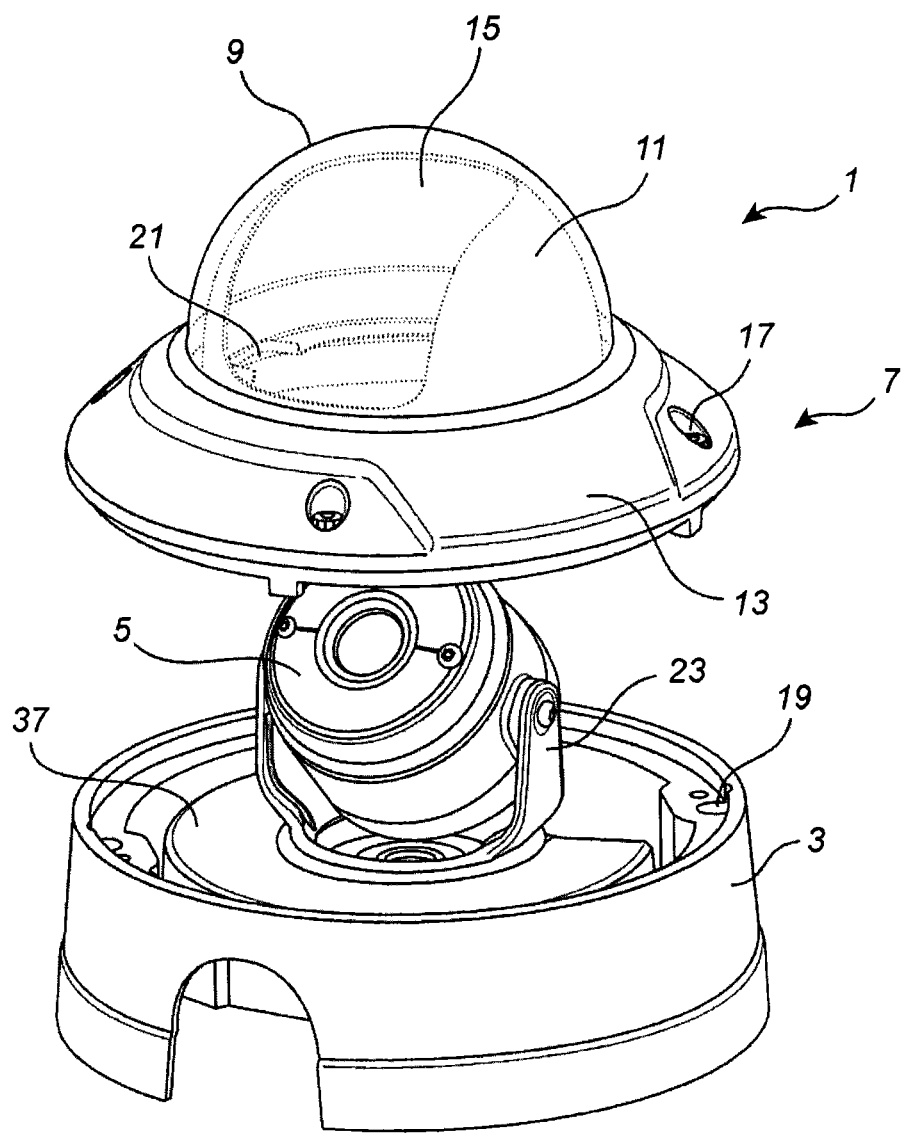
FIG. 1 shows a top cover assembly and a camera on a mounting base.

FIG. 1 shows a top cover assembly 1 and a mounting base 3 with a monitoring camera 5. The top cover assembly 1, the mounting base 3, and the monitoring camera 5 together form a monitoring camera assembly 7. The top cover assembly 1 comprises a dome window 9, a lining 11 and a mounting portion 13. The lining 11 is rotatable in relation to the mounting portion 13 and has an opening 15 adapted to the size and shape of a field of view of the camera 5. The lining 11 is provided to protect the camera 5 from reflexes from the dome window 9.

The lining 11 may be made of an opaque material, such as a non-transparent plastic material. The dome window 9 is normally made of a transparent material, such as a transparent plastic material. To protect the camera 5 against outside forces, the dome window 9 may be made of a material strong enough to be able to withstand a certain amount of blows and hits.

Figure 2:
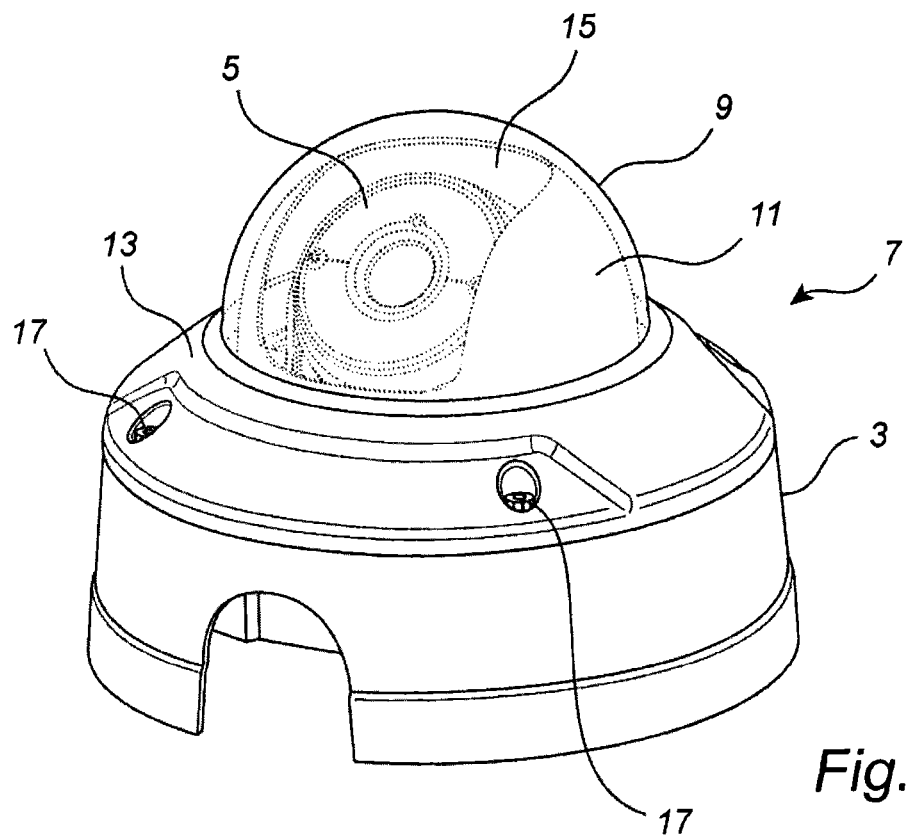
FIG. 2 shows a monitoring camera assembly in a mounted state.

FIG. 2 shows the monitoring camera assembly in mounted position where the mounting portion 13 is attached to the mounting base 3 by a plurality of screws 17 screwed into screw holes 19 on the mounting base 3. Other means of attaching the mounting portion 13 to the mounting base 3 may also be used, such as nuts and bolts or glue. The screws 17 may be placed with a 90° separation between them, and the screw holes 19 are then placed in a matching manner.

Figure 4:
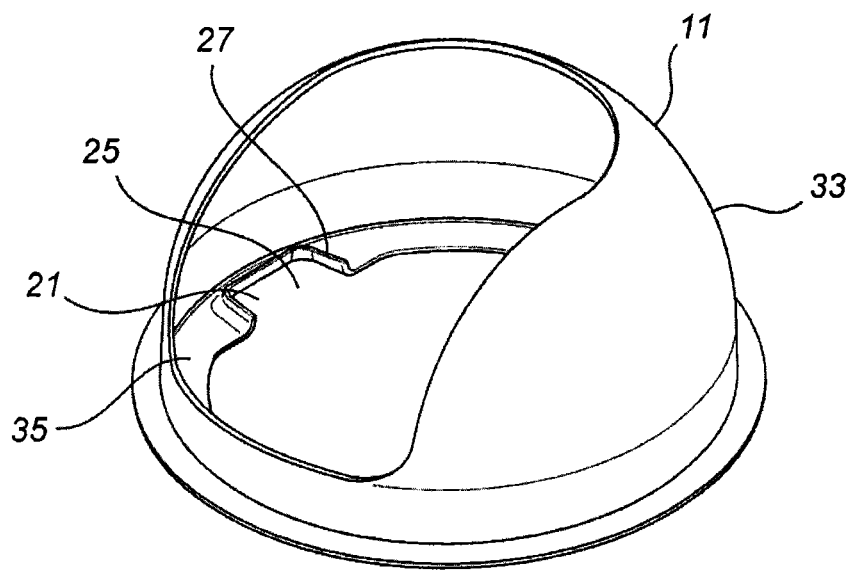
FIG. 4 shows a lining for a dome window in a perspective view.
Figure 5A:
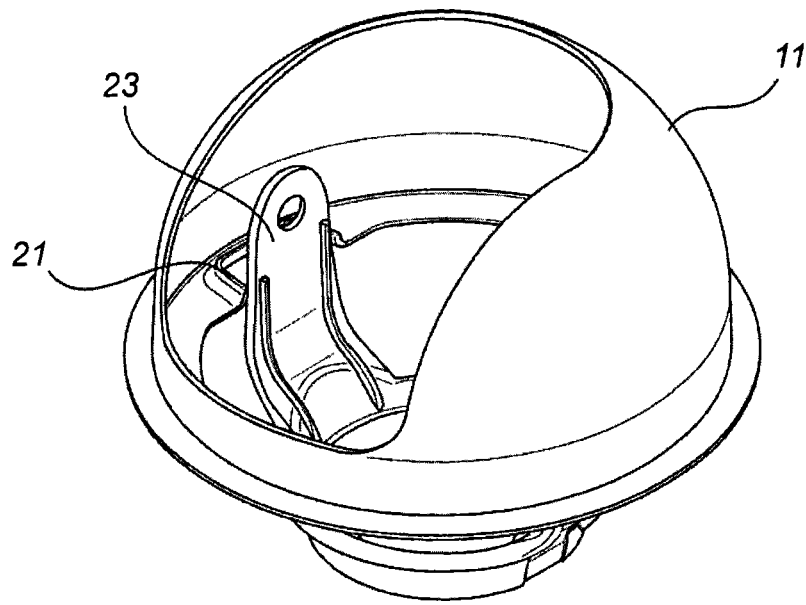
FIGS. 5a and 5b illustrate two embodiments of the lining and a mounting bracket for a monitoring camera.

As is shown in detail in FIGS. 4-5, the lining 11 has at least one guiding portion 21 with a shape matching at least a portion of a camera bracket 23, which holds the camera 5 on the mounting base 3. A common choice is to use two guiding portions 21, one for each end portion of the yoke-shaped mounting bracket 23. In this context it may be noted that the camera bracket 23 is often denoted "pan holder", the name being based on the fact that the camera bracket 23 with the camera 5 is rotatable, or "panable", in relation to the mounting base 3 to set a desired fixed pan position of the camera 5 at installation. Additionally, the camera 5 is rotatable, or tillable, e.g. by hand in the camera bracket 23 to set a desired fixed tilt position for the camera 5 at installation.

Figure 3:
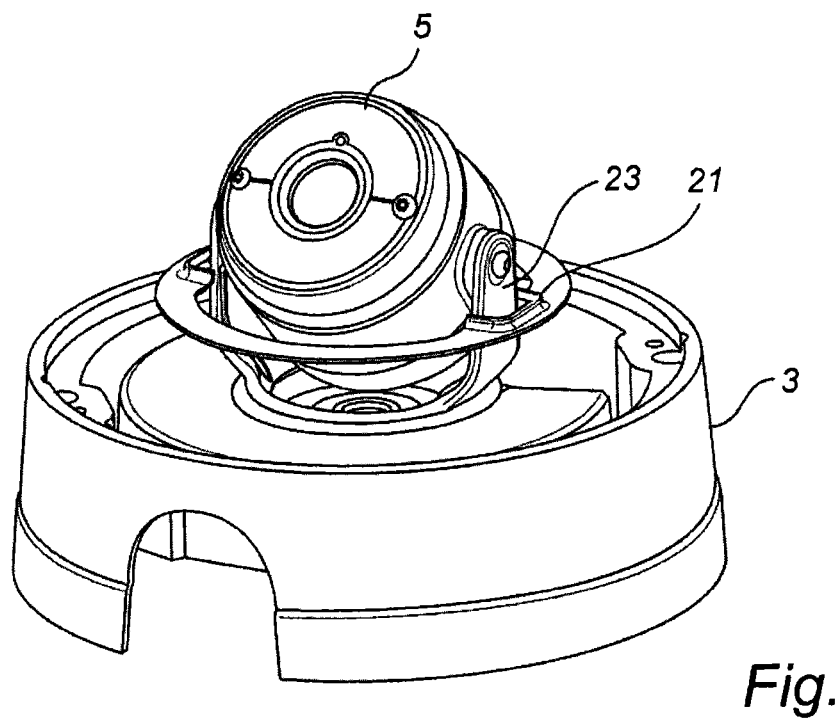
FIG. 3 illustrates a detail of the top cover assembly in a mounted position.

FIG. 3 shows a detail of the top cover assembly 1 when mounted on the mounting base 3 covering the camera 5. The figure clearly illustrates how the guiding portion 21 is in engagement with the camera mounting bracket 23.

Figure 10:
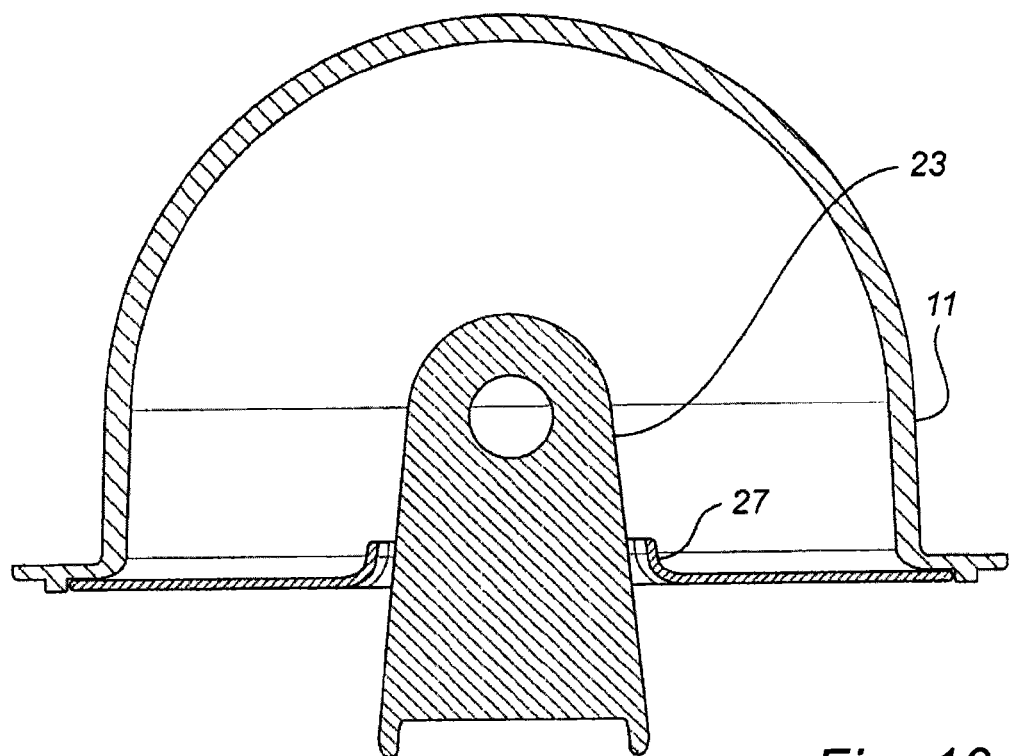
FIG. 10 is a sectional view from the side illustrating an embodiment of the lining and the camera mounting bracket.

As shown in FIGS. 4-7, the guiding portion 21 may comprise a groove, recess or slot 25, and a lip 27 may be provided at an edge of the slot 25 to improve the guiding properties of the guiding portion 21. The lip 27 may be arranged only at side edges 34 of the slot 25. The lip 27 may be slanted to even further improve the guiding onto the mounting bracket 23. This may also be combined with a tapered profile of the camera mounting bracket 23, as shown in more detail in FIG. 10. In this context it may also be noted that it is advantageous to provide the engagement between the lining 11 and the camera mounting bracket 23 as far from the camera 5 and as close to the bottom fixture of the camera mounting bracket 23 as possible. This so that the guiding and fixation of the lining is obtained in a stable manner at a position where the camera mounting bracket 23 is as rigid as possible.

Figure 7:
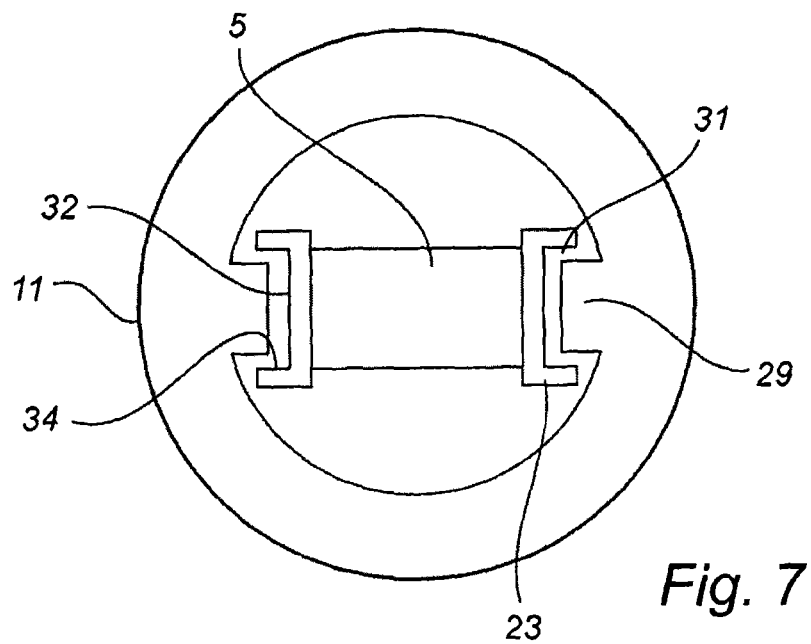
FIG. 7 is a sectional view from the top of an alternative embodiment of the top cover assembly in a mounted position.

In an alternative embodiment illustrated in FIG. 7, the guiding portion 21 comprises a tab 29 which matches a slot 31 arranged in the camera mounting bracket 23. The two embodiments may be combined in any suitable manner, and other shapes and forms of the guiding portion may also be used, such as a pin sliding into a hole, the pin being placed on the mounting bracket 23 and the hole on the lining 11 or vice versa.

Figure 6:
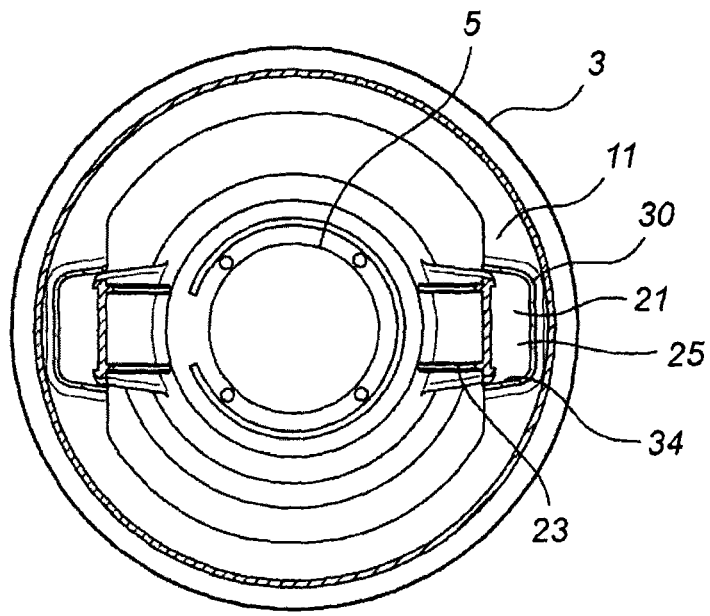
FIG. 6 is a sectional view from the top of the top cover assembly in a mounted position.

As also shown in FIGS. 6-7, the guiding portion 21 may advantageously be formed to allow a play in a radial direction between the guiding portion 21 and the camera mounting bracket 23, or in other words between the inner edge 30 of the slot 25 and the camera mounting bracket 23, or between the tab 29 and an inner edge 32 of the matching slot 31 on the camera mounting bracket 23. This play will reduce the risk of transferring the force of any blows or hits on the dome window to the camera.

It may be noted that the play between the camera mounting bracket 23 and the side edges 34 of the slot 25 or the slot 31 should be as small as possible to ensure a proper guiding of the lining 11 onto the camera mounting bracket 23, and to make sure that the lining 11 is held safely in place when mounted. When a tapered or slanted profile of the guiding portion 21 is provided, e.g. by using a slanted lip 27 on the side edges 34, the engagement between the guiding portion 21 and the camera mounting bracket 23 will be increasingly tighter as the guiding portion 21 gets closer to the bottom fixture of the camera mounting bracket 23.

The mounting base 3 may have a circular cross-section and the mounting portion 13 may be of an annular shape. The dome window 9 may be hemispherical, and the lining may have a hemispherical section 33 which is shaped accordingly, i.e. essentially following the shape of the dome window 9, with the exception for the opening 15. The lining 11 may be placed in contact with the dome window 9 or it may be placed with a suitable distance to the dome window 9. To provide a distance between the lining 11 and the dome window 9 may be advantageous as it reduces the risk of scratch marks on the dome window 9 when rotating this in relation to the lining 11.

In addition to the hemispherical section 33 the lining 11 may comprise an annular section 35. The two sections 33 and 35 may either be molded, e.g. by injection molding, in one piece, or they may be formed as two separate pieces which are attached to each other. The attachment may e.g. be in the form of a screw joint, a glue bond, a snap connection or an ultrasonic welding joint. The opening 15 for the field of view of the monitoring camera 5 is in this embodiment arranged in the hemispherical section 33 and the guiding portion 21 is arranged in the annular section 35.

Figure 5B:
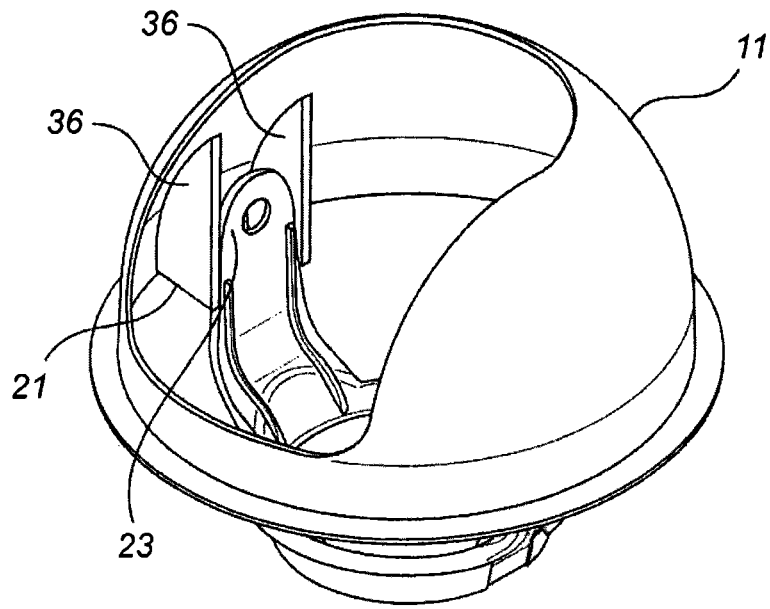
Figure 5C:
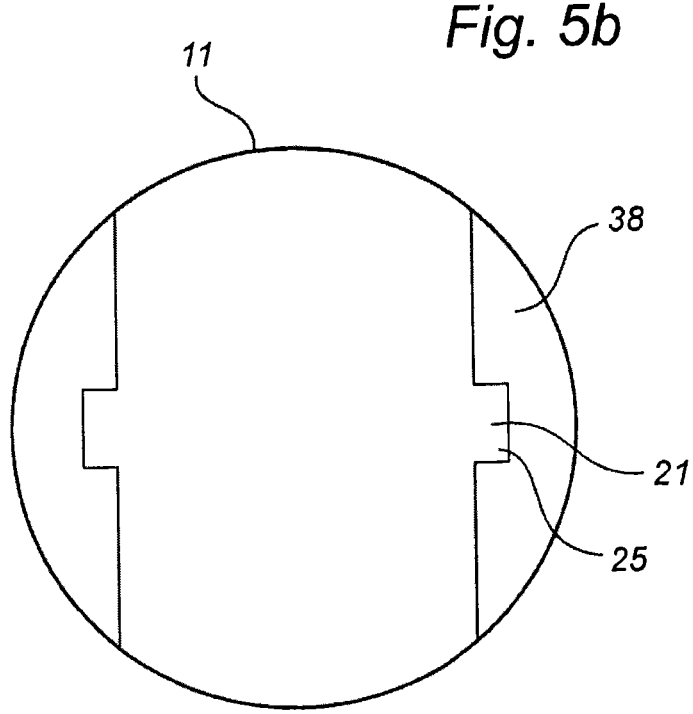
FIG. 5c is a sectional view showing a detail of yet another embodiment of the lining.

As an alternative, the guiding portion 21 may be provided on a portion or portions 38 extending from the hemispherical section 33. FIG. 5c illustrates this embodiment in cross-sectional view. In the figure, the guiding portion 21 is provided in the shape of a slot 25, but other variants of the guiding portion e.g. as discussed above, are also possible to use, such as a tab extending from the portion 38 and arranged for engagement with a matching slot on the camera mounting bracket 23.

As another alternative, the guiding portion 21 is placed at the hemispherical section 33 in the form of walls 36 or ribs extending from the hemispherical section and arranged for engaging the camera mounting bracket 23. This variant is illustrated in FIG. 5b. The guiding portion may also be arranged on the hemispherical section in the form of a tab arranged for engagement with a matching slot on the camera mounting bracket 23.

The provision of the guiding portion 21 on the hemispherical section is especially useful in a smaller camera installation, typically indoors, when the guiding portion 21 may be provided with an adequate stability. In a larger installation, it might be preferable to provide the guiding portion 21 on the annular section 35 to achieve a sufficient stability of the engagement between the guiding portion 21 and the camera bracket 23.

The process of assembling and mounting the monitoring camera assembly 7 with the top cover assembly 1 covering the camera 5 may take place in the following manner.

As a first step, the mounting base 3 is mounted in a desired position, e.g. on a wall or in a ceiling. The camera 5 with the mounting bracket 23 is attached to the mounting base 3. It may be noted that the camera 5 and the mounting bracket 23 are often mounted on a separate camera base 37, and this camera base 37 is then fixed to the mounting base 3 by the operator. As an alternative, the mounting base may comprise two parts, a plate which is attached to the wall or ceiling where the camera is to be mounted, and one part which is mounted on the plate and to which the camera base is attached.

The next step is to adjust the position of the camera 5 if needed. As mentioned above the tilt position of the camera 5 may be adjusted by rotating the camera in the camera bracket 23, and the pan position of the camera may be adjusted by rotating the camera bracket 23 in relation to the camera base 37, or, in other words in relation to the mounting base 3 and the wall or ceiling on which the mounting base is fixed. The camera may also be rotated around its own center axis to make sure that the image horizon is positioned correctly. When the desired position of the camera 5 has been set, which will allow monitoring of a desired location, the top cover assembly 1 is to be mounted over the camera 5 to shield and protect it from the environment and from unauthorized access and vandalism.

When mounting the top cover assembly 1, the top cover assembly 1 is placed over the camera 5 and the operator rotates the top cover assembly 1 until he notes that the guiding portion 21 engages with and slides onto or into the camera bracket 23. In this way the operator is helped to position the lining 11 with the opening 15 in the correct position over the camera 5 by means of the guiding portion 21. The guiding portion 21 engages with the camera bracket 23 only when the top cover assembly 1, or more precisely the lining 11, is rotated so that the opening 15 is in the correct position to allow the camera 5 to freely capture images through the opening 15, or, in other words, so that the opening 15 in the lining 11 covers the field of view of the camera 5.

When the operator notes that the lining 11 has been guided to its correct position by the guiding portion 21 and the camera bracket 23, he then rotates the mounting portion 13 in relation to the lining 11, together with or in relation to the dome window 9, to position the screws 17 on the mounting portion 13 over the screw holes 19 in the mounting base 3. During this rotation, the lining is held safely in place by the engagement between the guiding portion 21 and the camera mounting bracket 23. Finally, the mounting portion 13 is attached to the mounting base 3 by fastening the screws 17. Thus, the provision of the guiding portion 21 makes the installation process more efficient and makes it possible to reduce the time for mounting each camera, as no trial and error process is needed for positioning the lining 11 in relation to the mounting portion 13 and the camera 5. By means of the embodiments of the present invention, the top cover assembly 1 is instead positioned in a user-friendly and simple two-step process.

Figures 8, 9:
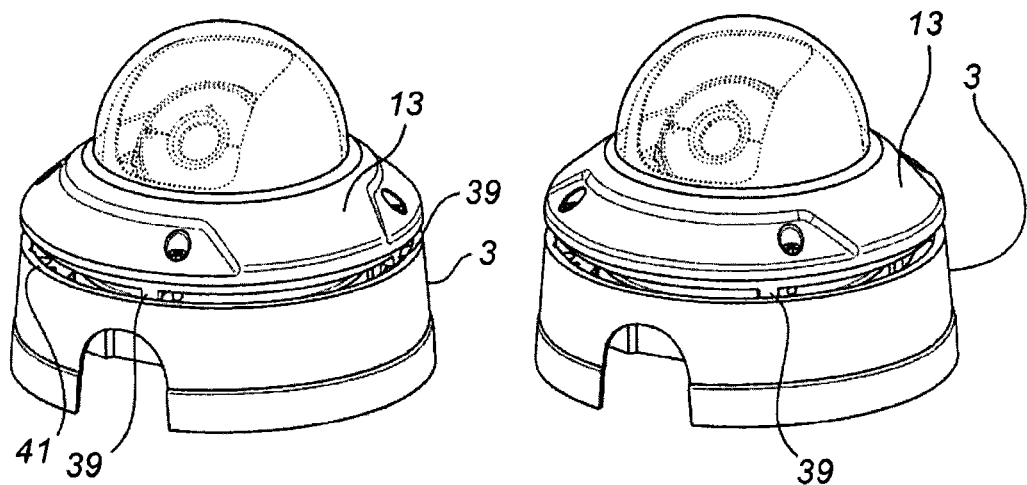
FIG. 8 shows a top cover assembly in a first rotational position in relation to the mounting base.
FIG. 9 shows the top cover assembly of FIG. 8 in a second rotational position in relation to the mounting base.

As best shown in FIGS. 8 and 9, the mounting portion 13 may comprise a number of guiding protrusions 39 which allow the mounting portion 13 to rest evenly on the mounting base 3 while the operator rotates the mounting portion 13 into the position where the screws 17 align with the screw holes 19, e.g. between the two positions of the mounting portion 13 which are illustrated in FIGS. 8 and 9. At the correct position, the protrusions 39 slide or slot into matching cut-outs 41 in the mounting base, and thereby aid the correct alignment of the mounting portion 11 to the mounting base 3 for the operator, in turn making the installation process less cumbersome. As noted above, the mounting portion and the mounting base may be equipped with screws and matching screw holes at every 90° around their circumference, and an operator may choose to mount the top cover assembly in such a position relating to the mounting base that a logotype present on the mounting portion is advantageously displayed. The provision of attachment points at every 90° additionally allows the operator to conveniently adapt the mounting in accordance with the position of different cables and wirings.

The top-cover assembly 1 may be used as a spare part when there is a need to replace a damaged top-cover assembly in an existing camera installation. The size and shape of camera mounting brackets are often similar in different monitoring camera assemblies and the same top cover assembly may therefore be used for different camera models.

During the life time of the camera 5, e.g. in a situation where the camera 5 is exposed to vibrations or blows on the dome window 9 in an attempt to vandalize the camera, the guiding portion 21 has the advantageous effect of holding the lining 11 in its correct position in relation to the camera, or in other words making sure that the opening 15 in the lining 11 is always positioned to cover the field of view of the camera 5 so to allow the camera 5 to continue capturing images through the opening 15.

As mentioned above, the dome window 9 may also be rotatable in relation to the lining 11, which means that if someone tries to obscure the camera view by an attempt to rotate the lining 11 by grabbing the dome window and rotating it in relation to the mounting portion 13, the position of the lining 11 will not be affected.

The invention claimed is:

1. A top cover assembly for a monitoring camera assembly, comprising
   a mounting portion arranged for attachment to a mounting base for a monitoring camera,
   a dome window arranged on the mounting portion,
   a lining arranged at an inside of the dome window, and having a camera view opening adapted to a field of view of the monitoring camera, the lining being rotatable in relation to the mounting portion,
   the lining having a guiding portion arranged for engagement with a camera mounting bracket on the mounting base to position the lining in relation to the monitoring camera such that the camera view opening covers the field of view of the monitoring camera, when mounting the top cover assembly on the mounting base, thereby allowing the mounting portion to be rotated in relation to the lining into a position for attaching the mounting portion to the mounting base, wherein the guide portion comprises a lip slanted to provide a tapering matching a tapering of the camera mounting bracket that extends toward a bottom of the camera mounting bracket,
   wherein the engagement between the guiding portion and the camera mounting bracket becomes tighter as the guiding portion gets closer to the bottom of the camera mounting bracket.

2. The top cover assembly of claim 1, wherein the guiding portion comprises a slot arranged to receive a matching portion of the camera mounting bracket.

3. The top cover assembly of claim 1, wherein the guiding portion comprises a tab arranged to engage with a matching slot at the camera mounting bracket.

4. The top cover assembly of claim 1, wherein the lining comprises a hemispherical section following the shape of the dome window, and an annular section arranged at an edge of the hemispherical section, wherein the guiding portion is arranged at the annular section, and the camera view opening is arranged in the hemispherical section.

5. The top cover assembly of claim 4, wherein the hemispherical section and the annular section are two separate pieces attached to each other.

6. The top cover assembly of claim 5, wherein the hemispherical section and the annular section are attached to each other by a screw joint, by a glue bond, by an ultrasonic welding joint, or by a snap connection.

7. The top cover assembly of claim 1, wherein the lining comprises a hemispherical section following the shape of the dome window, and wherein the guiding portion is arranged at the hemispherical section and has the form of ribs extending inwards from the hemispherical section.

8. The top cover assembly of claim 1, wherein the lining is made of an opaque material and the dome window is made of a transparent material.

9. The top cover assembly of claim 1, wherein the dome window is rotatable in relation to the lining.

10. A monitoring camera assembly comprising
    a mounting base,
    a monitoring camera mounted on the mounting base via a camera mounting bracket,
    a top cover assembly according to claim 1.

11. The monitoring camera assembly of claim 10, wherein the mounting portion comprises a plurality of protrusions arranged to slot into matching cut-outs on the mounting base when the mounting portion is in the position for attaching the mounting portion to the mounting base.

12. The monitoring camera assembly of claim 10, wherein the guiding portion is arranged with a play in a radial direction to the camera mounting bracket.

13. The top cover assembly of claim 1, wherein the lining comprises a hemispherical section following the shape of the dome window, and an annular section arranged at an edge of the hemispherical section,
- the guiding portion is arranged at the annular section, and the camera view opening is arranged in the hemispherical section,
- the guiding portion comprises a slot arranged at the annular section and arranged to receive a matching portion of the camera mounting bracket, and
- the lip is arranged at an edge of the slot with three sides surrounding the slot.

* * * * *